United States Patent
Bogtstra

[11] Patent Number: 5,707,226
[45] Date of Patent: Jan. 13, 1998

[54] BURNER

[75] Inventor: Arnold N. Bogtstra, Groningen, Netherlands

[73] Assignee: N.V. Nederlandse Gasunie, Netherlands

[21] Appl. No.: 600,014

[22] Filed: Feb. 14, 1996

[30] Foreign Application Priority Data

Feb. 15, 1995 [BE] Belgium .................. 09500120

[51] Int. Cl.⁶ .................................. F23D 11/44
[52] U.S. Cl. .................. 431/215; 431/328; 431/330; 126/39 H
[58] Field of Search .................. 431/215, 328, 431/326, 347, 348, 354, 330; 126/39 H, 39 N, 39 R, 39 K

[56] References Cited

U.S. PATENT DOCUMENTS

| | | | |
|---|---|---|---|
| 1,494,651 | 5/1924 | Tyrrell | 431/330 X |
| 1,569,967 | 1/1926 | Danielson | 431/330 X |
| 3,212,554 | 10/1965 | Blaha . | |
| 3,782,883 | 1/1974 | Nesbitt . | |
| 4,927,353 | 5/1990 | Nomura et al. | 431/328 |

FOREIGN PATENT DOCUMENTS

| | | |
|---|---|---|
| 601269 | 6/1994 | European Pat. Off. . |
| 1345587 | 3/1964 | France . |
| 2181326 | 11/1973 | France . |
| 2402831 | 4/1979 | France . |
| 832470 | 2/1952 | Germany . |
| 3305186 | 11/1983 | Germany . |
| 155354 | 4/1978 | Netherlands . |
| 1414043 | 3/1973 | United Kingdom . |
| 1368690 | 10/1974 | United Kingdom . |
| 2004052 | 9/1978 | United Kingdom . |
| 2123946 | 5/1983 | United Kingdom . |
| 2155614 | 9/1985 | United Kingdom . |

*Primary Examiner*—Larry Jones
*Attorney, Agent, or Firm*—Cushman Darby & Cushman Intellectual Property Group of Pillsbury Madison & Sutro, LLP

[57] ABSTRACT

Burner for a gaseous fuel, provided with separate supply lines for fuel and oxidizing gas, the oxidizing gas being tangentially fed into a cylindrical swirl chamber, which is connected to a burner bowl through a mixing channel, the fuel being radially supplied at the connection of the swirl chamber to the mixing channel. The burner is optionally provided with an integrated heat exchanger. A composite burner system is disclosed, made-up of burners as described above and optionally provided with a plate which isolates the burners from the surrounding area and which indirectly heats the surrounding area.

22 Claims, 5 Drawing Sheets

BURNER

BACKGROUND OF THE INVENTION

1. Field of the Invention

The invention relates to a burner of the type comprising a swirl chamber in the form of a right cylinder with a side wall, a bottom face and a top face, a burner bowl disposed behind the swirl chamber on the axis of the swirl chamber, which opens into a surface of the burner and which connects to the burner through an opening in the top face of the swirl chamber, at least one supply line for an oxidizing gas to the swirl chamber, and a supply line for the gas to be combusted, which is disposed coaxially to the swirl chamber.

2. Description of Related Art

A burner of the above-mentioned kind is disclosed in DE-A-3,305,186, the complete disclosure of which is incorporated herein by this reference. In that burner, the burner bowl and hence the combustion flame and the combustion products directly communicate with the surrounding area and the objects present in it.

In many applications it is undesirable for the objects to be heated with the burner to come into contact with the combustion products that are released, or to be in direct contact with naked flames. One might therefore consider installing a sealing plate in front of the burner, which seals the burner from the surrounding area. In this way, contact of the combustion products or naked flames with the surrounding area and the objects present in it is prevented. This plate is heated by the usually gaseous combustion products and the heat radiation of the hot burner. As a result, the plate will radiate and so dissipate its heat to the surrounding area and more particularly to the objects to be heated. For good heat transfer from the burner to the plate, henceforth referred to as radiation plate, it is desirable to select a distance therebetween which is as small as possible. A disadvantage of the burner disclosed in DE-A-3,305.106, however, is that the combustion behavior thereof is adversely affected and that the flame may even extinguish when a sealing plate is provided in front of the burner and the distance between the plate and the burner is selected to be small such as, for example, less than 5 or even 10 mm.

The face of the burner where the combustion flame exits is henceforth referred to as the top face of the burner.

SUMMARY OF THE INVENTION

An object of the burner of the present invention is to avoid the aforementioned disadvantage or to have that disadvantage to a lesser extent and which continues to give stable combustion even when a plate is provided in front of the burner at a distance of 10 mm or even 5 mm or less.

This and other objects are achieved according to the burner of the present invention by providing that the supply line for the oxidizing gas opens tangentially into the side wall of the swirl chamber;

a mixing channel is located between the opening in the swirl chamber and the burner bowl;

the fuel supply line extends through the swirl chamber into the mixing channel and is supplied, at the opening in the top face of the swirl chamber, with outflow openings disposed at preferably a right angle to the axis; and the cross-section of the swirl chamber at a right angle to the axis has a larger area than the cross-section of the opening in the top face of the swirl chamber.

It is remarkable that combustion in a burner with dimensions in accordance with the invention is highly stable even when a sealing radiation plate is located at a very small distance away from the top face of the burner. A distance of 10 mm, 5 mm, and even from 2 mm to 1 mm between this plate and the top face of the burner has been found to be acceptable. Indeed, it has been found possible to sustain combustion even when the plate connects to the top face of the burner without any space therebetween, provided that in such a case, the combustion products are carried-off in another manner, for example by means of grooves in the radiation plate or in the casing connecting to the top face of the burner. Furthermore, the burner was found to have a large turn-down ratio. The dissipated power can vary by a factor of 15 with stable combustion taking place across the entire modulation range.

Fuel and oxidizing gas are mixed as far downstream as in the burner, which accordingly is of the non-premixed type or nozzle-mix type.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The invention will be illustrated by the following figures, where.

DETAILED DESCRIPTION OF THE PRESENTLY PREFERRED EXEMPLARY EMBODIMENTS

Figure 1:
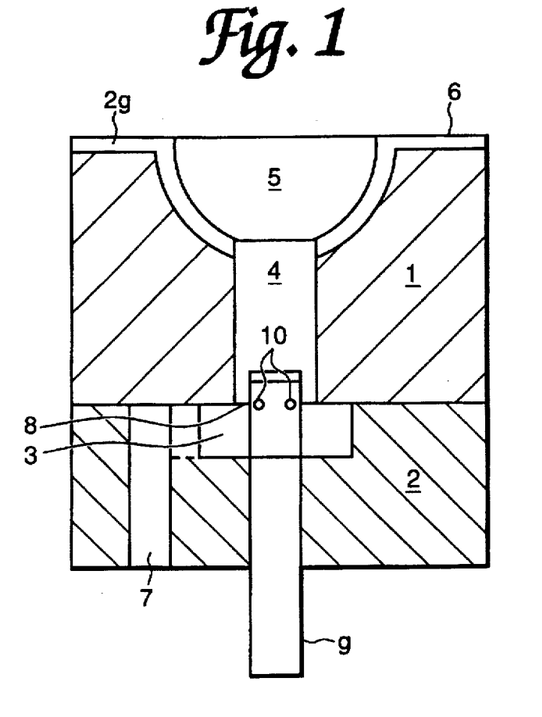
FIG. 1 is a cross-sectional view of a burner of the invention along its axis.

In FIG. 1 a burner is formed by the spaces left in a housing or block consisting of parts 1 and 2. Each burner consists of a swirl chamber 3, which through a mixing channel 4 communicates with a burner bowl 5, which ends in a top face 6. Air is supplied through an air supply line 7 and supply channel 11 (not shown completely in FIG. 1) which tangentially connects to the wall of swirl chamber 3. The course of channel 11 is schematically indicated by a dotted line in FIG. 1. The channel 11 and the connection thereof to swirl chamber 3 are shown in FIG. 2.

The air so supplied to the swirl chamber 3 is put into rapid rotating motion by the tangential entry thereof. The rapidly rotating air is directed to mixing channel 4 through opening 8, which has a cross-sectional area smaller than that of the remaining part of the swirl chamber 3. Through supply line 9, the gas to be combusted is supplied to mixing channel 4 at the opening 8. In that location, the air flowing out of swirl chamber 3 swirls vehemently so that intimate mixing the air and the gas to be combusted is effected. This effect is amplified by the outflow opening being narrowed by the presence of the gas supply line at that opening. At the end of gas supply line 9 a number of outflow apertures 10 are provided that are disposed at a right angle to the axis of the swirl chamber.

The gas-air mixture is ignited by a conventional ignition device (not shown), whereupon combustion takes place in mixing channel 4 and is continued in the burner bowl 5, which becomes completely filled with the flame. As a result, the wall of the burner bowl reaches a high temperature. Flame columns may even extend beyond the top face 6.

Figure 2:
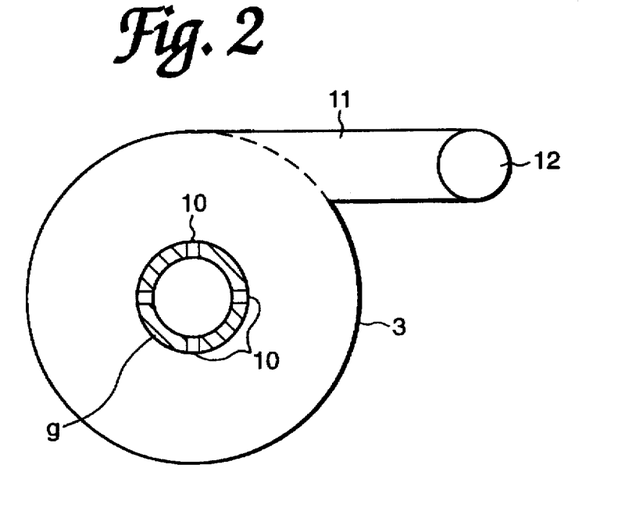
FIG. 2 is a cross-sectional view taken at a right angle to the axis at the inlet of the mixing channel of the burner shown in FIG. 1.

As shown in FIG. 2, supply channel 11 is tangentially connected to the wall of swirl chamber 3. The location of the connection to the air supply line 7 is indicated at 12. At the center of the swirl chamber 3 is the gas supply line 9 containing the openings 10 from which the gas flows in a radial direction.

The dimensions of the burner may vary between wide limits depending on the application. In industrial applications, for example in a drying oven, the dimensions of the opening of the burner bowl in the top face 6 may be between 5 cm and 20–50 cm. In household applications and in applications in a composite burner system comprising a plurality of burners arranged side by side for uniformly heating a larger surface, the aforementioned dimensions may be between for example 5 mm and 100 mm, and preferably between 10 mm and 50 mm. The capacity of the burner of the invention when incorporated in a composite burner system (discussed below) preferably is at most 500 W, preferably at most 400 W and more preferably at most 300 W. The cross-section of the burner bowl 5 narrows from the top face 6 towards the connection to one end of the mixing channel 4. This end is henceforth referred to as the outlet of the mixing channel.

The cross-section of the burner bowl 5 at a right angle to the axis is preferably circular. The inner wall of the burner bowl 5 may be convex, conical or concave. A convex inner wall results in a so-called flat flame burner. This type of burner is highly suitable for use in gas cookers for, for example, household use. Flat flame burners, however, have been found not to be suitable in a burner sealed with a radiation plate. If the burner is used for heating a radiation plate placed in front of it, the burner bowl preferable is concave. This has been found to afford better transfer of the heat of combustion to the radiation plate. Temperatures of 800° C. and higher have been found achievable with the use of burners having a concave burner bowl 5. In a particular embodiment the burner bowl is cylindrical, with the diameter optionally increasing in increments. Preferably, there is a circular groove in the top face of the burner, which runs concentrically with the burner bowl. It has been found that in that case combustion also takes place in the annular groove outside the burner, and this yields a larger heating area and thus highly uniformly spread heating with equal dimensions of the burner proper.

At the outlet of the mixing channel 4, the diameters of the burner bowl 5 and of the outlet preferably are equal. The diameter is between 10% and 80%, and preferably between 25% and 60% of the diameter of the opening of the burner bowl. The end of the mixing channel 4 disposed opposite the outlet, henceforth referred to as the inlet, is connected to the opening in the top face of the swirl chamber 3. The diameters of this inlet and of the opening in the swirl chamber 3 preferably are equal to one another. The diameter ratio between the diameter of opening 8 in the top side of the swirl chamber 3 and the diameter of the swirl chamber is preferably between 0.3 and 0.7, and more preferably between 0.45 and 0.55.

The vertical length of the mixing channel 4 is at least 70% of the diameter of the opening of the burner bowl and hence, depending on this diameter, at least 7 mm, preferably at least 10 mm, and more preferably at least 15 mm so as to obtain good mixing of the oxidizing gas and the gas to be combusted and stable combustion even when a radiation plate is placed in front of the burner at a short distance.

The mixing channel 4 may be conical or cylindrical or may widen from the inlet to the outlet in one or more steps. The ratio between the diameter and the length of the mixing channel 4 is between 1:1 and 1:3, preferably between 1:1.5 and 1:2.5, and most preferably between 1:1.8 and 1:2.2.

In the mixing channel 4 the oxidizing gas entering the opening with rotating motion is mixed with the fuel supplied at the opening in the swirl chamber and combustion of the mixture so formed is begun. This is advantageous for obtaining complete combustion of the mixture.

At each burner, the oxidizing gas is supplied to the swirl chamber 3 through one or more feed arrangements that open into the side thereof and lead the gas into the swirl chamber tangentially to the side wall. GB-B-1,414,043, the complete disclosure of which is incorporated herein by this reference, describes supplying gas to a swirl chamber and in FIG. 2 thereof, two feed pipes pass through the side wall at diametrically opposed locations. It is noted that in GB-B-1, 414,043 the fuel and the oxidizing gas are mixed ahead of the inlet in the swirl chamber. A burner with a tangential feed arrangement is also disclosed in NL-A-155354, the complete disclosure of which is incorporated herein by this reference. Fuel, not oxidizing gas, is fed to that burner and, also, no mixing channel is present and mixing takes place as far downstream as in the burner bowl, which is unfavorable with respect to combustion efficiency. The height of the swirl chamber has been found to be critical for obtaining a good heating of the radiation plate. The ratio of the height of the swirl chamber 3 to the length of the mixing channel 4 preferably lies between 1:8 and 1:2 and more preferably between 1:6 and 1:2.5.

The aforementioned tangential feed arrangement ensures that the gas is supplied directly along the wall, is deflected by the wall and is put into a rapid rotating motion. The oxidizing gas, rotating as just described, exits from the swirl chamber 3 through the opening. Air or oxygen, for example, is used as the oxidizing gas. In practice, air is preferably used. Air as used herein below should be taken to include air, oxygen, or any other suitable oxidizing gas or gas mixture.

The gaseous fuel, for example natural gas, butane or propane, coal gas or mixtures of such gases, is supplied through supply line 9 which is separate from the supply line 7 for the oxidizing gas. Supply line 9 preferably passes through the bottom face of the swirl chamber 3, for instance along its axis, extends through the swirl chamber and terminates at the location of the mixing channel 4 inlet. The gas supply line may extend a short distance, for example from 0.1 mm to 10 mm, into the mixing channel 4.

The fuel is supplied at the location of the opening 8 in the top side of the swirl chamber 3, where the rapidly rotating air enters the mixing channel 4. The supply line 9 is provided with the outflow openings 10, which may be for example round or slot-shaped, disposed at the circumference of the supply line, preferably at a right angle to the axis of the swirl chamber, causing the fuel to exit in a radial direction from the openings. Deviations of up to about 10° from the radial direction are allowable.

In another embodiment, the fuel, too, is tangentially fed into the swirl chamber or into the mixing channel in the vicinity of its inlet. The dimensions of the supply lines are so chosen as to obtain the desired forward velocity of the fuel-air mixture in the mixing channel 4. This velocity is between 2 and 10 m/s, preferably between 3 and 7 m/s. Optimum combustion behavior is obtained with the speeds in this range in combination with the swirling motion of the air. Based on the diameter of the mixing channel and the dimensions of the swirl chamber, whose relative specifications are described in the foregoing, it follows that the velocity of the air in the supply line 9 to the swirl chamber 3 should be between about 4 and 20 m/s, and preferably between 5 and 15 m/s. The ratio between the amounts of air and fuel is chosen as the stoichiometric ratio, to which up to 30%, preferably from 5 to 20% excess air is added. The pressures required in the fuel plenum and the air plenum can be determined from this using Bernoulli's law. The diameter of the air supply line 9 to the swirl chamber 3 is between 5 and 50% of the diameter of the swirl chamber, and preferably between 10 and 25% thereof.

The supplied fuel, on exiting the supply line, comes into contact with the air that has been brought into a rapid rotating motion so that intimate mixing of the fuel and the air is effected.

The swirl chamber 3, the mixing channel 4 and the burner bowl 5 may be formed by cut-outs in a block of suitable refractory material. In that case, the shape and the outside dimensions of such a block may be freely chosen to meet the requirements, such as those imposed on installation by the facility in which the burner is to be used. Such a block may also be composed of a plurality of components which on assembly enclose spaces of the desired shape and dimensions.

The aforementioned components may also be fashioned independently from one or more molded objects having a particular wall thickness. It is preferred for the burner of the invention to be left as a space in a block. It is also preferred for the walls of the spaces that make up the burner to consist of a heat-insulating ceramic material, although they may also be fashioned from suitable metals.

Figure 3:
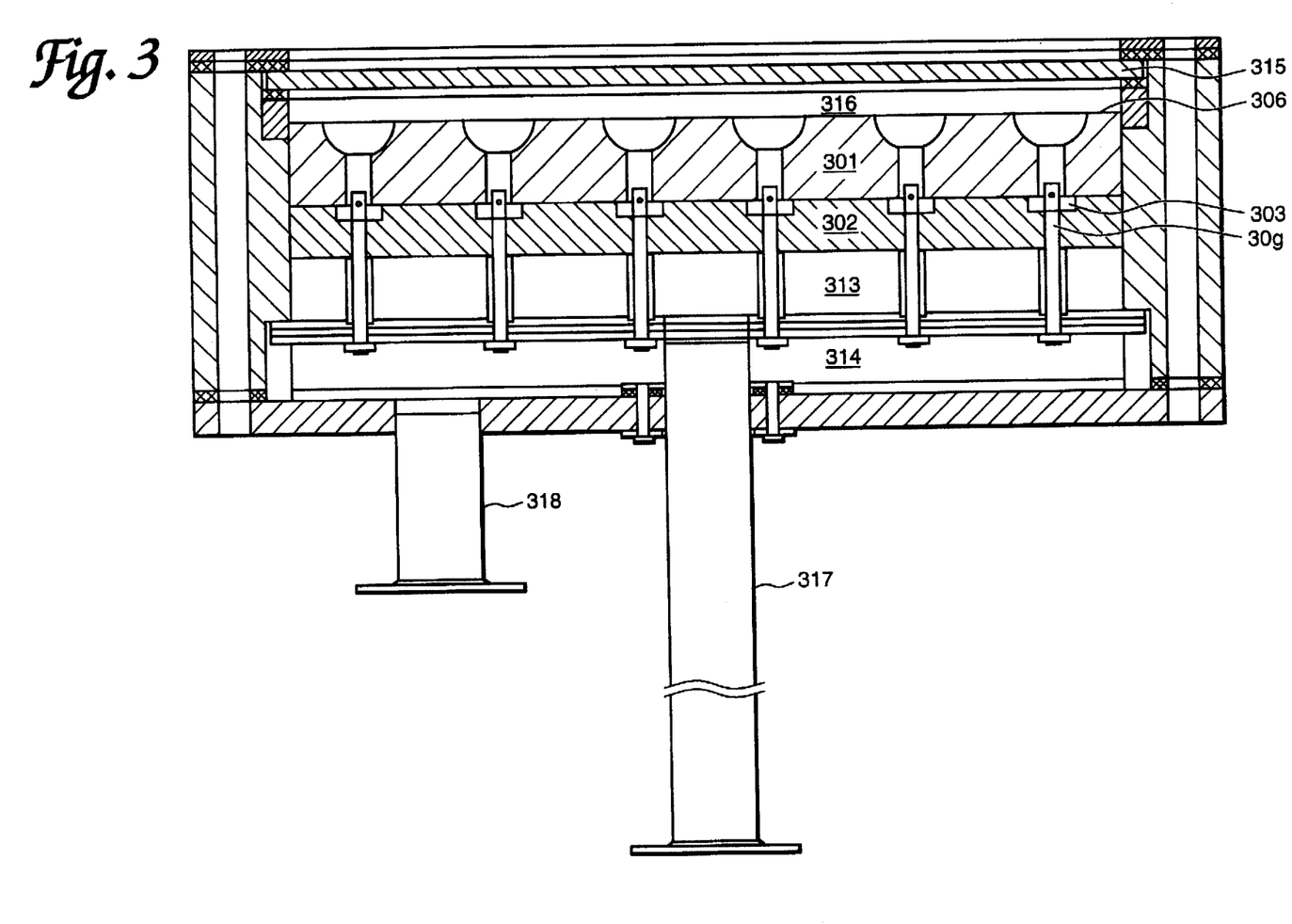
FIG. 3 is a cross-sectional view of a composite closed burner of the invention, in which burners in accordance with the invention are provided.

FIG. 3 shows six identical burners of the type shown in FIG. 1, which are formed by spaces left in a block consisting of the parts 301 and 302. Air from air plenum 313 is supplied through air supply channels (not shown) whereupon it tangentially enters the swirl chambers 303, in the manner shown in FIGS. 1 and 2. The gas to be combusted is supplied through the supply channels 309 from gas plenum 314 to the mixing channel 304 of the burner. Combustion causes the wall of the burner bowl 305 to reach a high temperature. The radiation plate 315, placed at a distance A away from the burners, reaches a high temperature and begins to radiate as a result of radiation from the wall of the burner bowl, contact with the hot combustion gases and possibly as a result of direct contact with the flame. If for example natural gas is combusted with air, the temperature of the plate rises to 800° C. or higher.

The combustion gases enter the space or 316 between the top face 306 and radiation plate 315 from where they are carried-off to a central heat exchanger (not shown in the figure). The combustion air is preheated by this heat exchanger and supplied to air plenum 313 through air line 317. Gas is supplied to gas plenum 314 through central gas line 318.

Thus, the burner of the invention is particularly suitable for use in a composite burner system consisting of a number of adjoining individual burners, which together can make up a heat dissipating surface of almost any desired shape and size. Combustion may optionally be screened-off from the surrounding area by locating a sealing plate over the top face of the burners. In this way, a closed, composite burner system is obtained. The sealing plate may be either gas-tight if the flue gases are not to be introduced into the surrounding area or porous if this is not objectionable, but direct contact of naked flames with the surrounding area is to be avoided. Such a composite burner system may also be fashioned by leaving the spaces for a plurality of burners in a single block. The burner of the invention, do to its special property that it assures good combustion even in a closed burner system, in which the distance between the radiation plate and the top face of the burner is small, is highly suitable for use in such a closed burner system.

It has been found that in a closed composite burner system, in particular one composed of burners according to the invention having a concave burner bowl, a considerably more uniform heating of the radiation plate can be achieved than with the conventional single large-area burners. In particular it has been found possible to construct a burner having a large area uniformly heated to the remarkably high temperature of 800° C. and higher.

For that reason, as discussed above, the invention also relates to a composite burner system comprising one or more burners of the invention. In particular, the invention also relates to a closed composite burner system that is made up of a number of adjoining burners of the invention, preferably burners having a concave burner bowl, whose top faces lie in one plane and which are incorporated in a casing which is closed by means of a heat-resistant plate disposed over the top face of the burners and in which each burner is provided with separate supply lines for fuel and oxidizing gas. The radiation plate 315 can reach a higher temperature in the burner system of the invention, in particular in a system composed of burners having a concave burner bowl, than in closed burner systems employing state-of-the-art burners. Suitable burner systems are rectangular or square and have an area of from, for example, 10 cm×10 cm to 40 cm×80 cm, in which, for example, from 2×2 to 5×5 burners per 10 cm×10 cm are incorporated. Burner systems having larger diameters are preferably made up of elements of for example 10 cm×10 cm or 10 cm×20 cm, in which, for example, 2×2 to 3×3 or 2×4 to 3×6 burners of the invention are incorporated.

In a composite burner of the invention the oxidizing gas is preferably supplied through a common line to a plenum, to which the supply lines of the individual burners are connected.

For the fuel supply in a composite burner, use is also preferably made of a common line for the supply to a plenum, to which the supply lines to the individual burners are connected.

The burner is provided, in the manner known per se and usual, with a device for igniting the fuel-air mixture. Examples thereof are spark and glow devices. In a composite burner system ignition devices may be provided in a plurality of locations if desired. Also, grooves may be provided in the top face of the burner extending from the ignition device to the burners located further away therefrom, through which an ignition front can propagate. The burner or burner system preferably also is provided with a flame detection device by way of protection.

While burning, the ignited mixture spirals through the mixing channel 4 and then along the inner wall of the burner bowl 5 so that it is heated and begins to radiate. The construction of the burner of the invention prevents backfiring to the swirl chamber.

The hot combustion products issue from the burner bowl and, if the burner is incorporated in a closed burner system, may heat a radiation plate 315 provided over the burner. The distance between the radiation plate and the top surface of the burner is from 10 mm to preferably at most 5 mm, more preferably at most 2 mm, and most preferably at most 1 mm. Distances larger than 10 mm are very well possible but less attractive because the heat transfer to the radiation plate decreases with increasing distance.

Heat transfer to the plate 315 is extremely good due to the small distance between the plate and the burners, so that a maximum heating effect and a high energy efficiency are attained.

The radiation plate 315 should consist of a material that is highly heat conductive, resistant to thermal shocks and has a low coefficient of thermal expansion. Examples of such a material are suitable metals or alloys or heat conductive ceramic materials. It is preferred for silicon carbide to be used as material for the radiation plate.

The flue gases may be carried-off through the space between the radiation plate and the top face of the burners to a discharge line.

Figure 5:
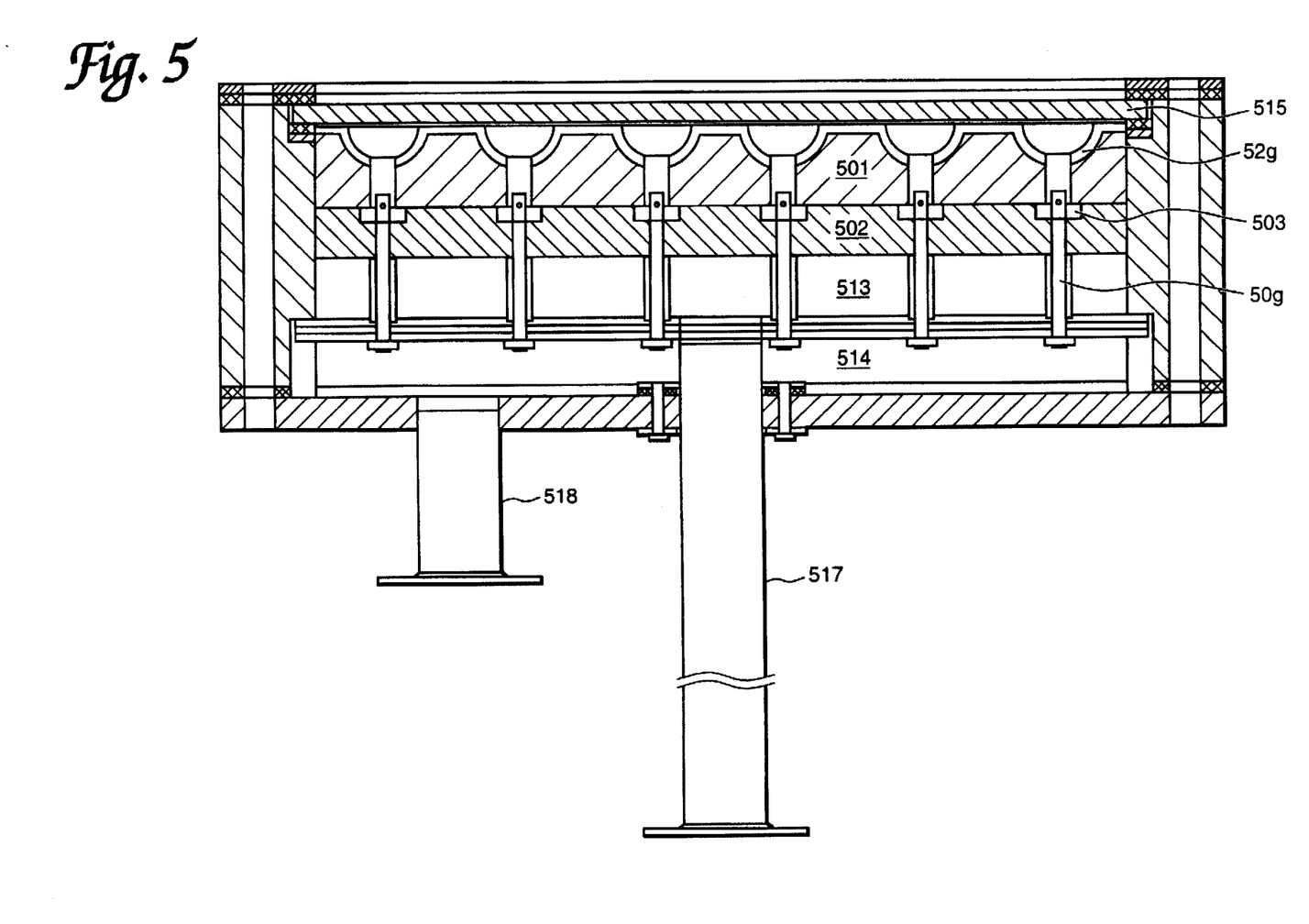
FIG. 5 is a cross-sectional view similar to FIG. 3, but wherein the plate connects to the top surface of the burner without any space therebetween.
Figure 6:
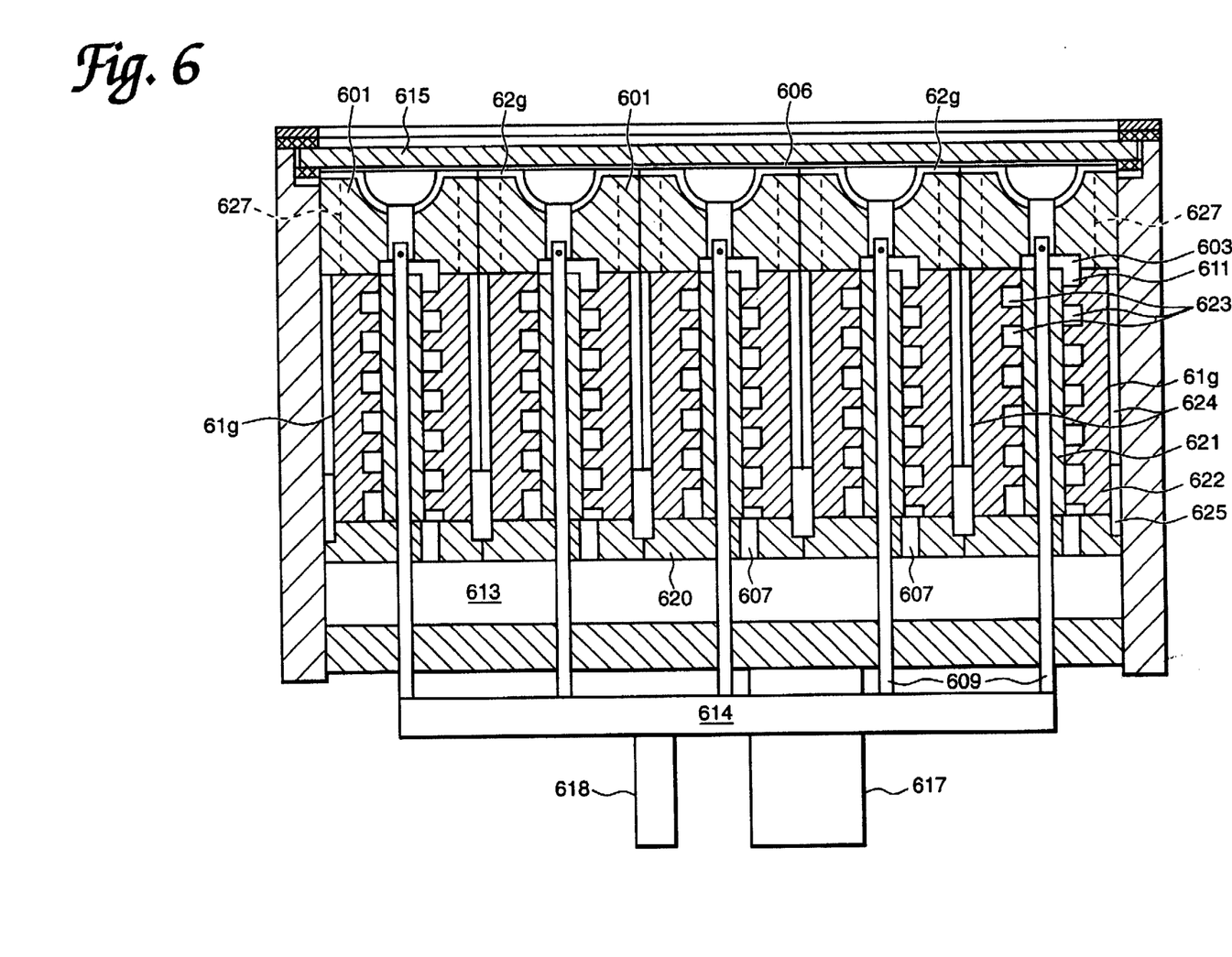
FIG. 6 is a cross-sectional view similar to FIG. 4, but wherein the plate connects to the top surface of the burner without any space therebetween.

Grooves 29 may be provided in the top face 6. The presence of such grooves ensures that the combustion gases can readily be carried-off even when there is only a small space or gap between the radiation plate and the top face 6. Accordingly, it is also preferred for the inner wall of the burner wall of the burner bowl 5 of the composite burners to be provided with grooves 29 for carrying-off the combustion gases, which grooves extend up to or into the top face. In that case, the distance between the plate and the top face of the individual burners preferably is at most 1 mm, more preferably the plate is placed on the aforementioned top face. Exemplary systems where the space or gap between the plate and the top face of the individual burners is minimal or there is no such gap are schematically illustrated in FIGS. 5 and 6. The reference numerals used therein correspond to those used respectively in FIG. 3 and FIG. 4 (referenced below). This may be done to extremely good effect when each burner is provided with an individual heat exchanger and passages are present in the burner block for carrying the combustion gases off to the heat exchangers (e.g. FIG. 6).

A still higher efficiency is attained in a preferred embodiment of the closed composite burner system of the invention in which it is provided with a heat exchanger to which the supply line for the air and the discharge line for the combustion gases are suitably connected so that the combustion gases give off their residual heat to the oxidizing gas. Heat exchangers for gases that are known per se may be employed in the burner system of the invention. The heat exchanger may be integrated in the burner system or be fitted outside the burner system.

In a preferred embodiment a through connection is present in the burner body outside the burner bowl, which connection runs from the top face of the burner to the receptacle under the swirl chamber, with the air supply lines also running through the burner body. In this way, the air supplied is preheated by the combustion gases immediately before it enters the swirl chamber. In that case, the air supply lines preferably are spiralled so as to obtain good heat transfer. In this way, a highly compact burner system with integrated heat exchanger can be obtained, whose height may be less than 10 cm or even less than 8 cm. Preferably a double spiral is used, the spirals each ending on opposite sides of the swirl chamber, providing a double driving force for the swirl of the oxidizing gas.

In a more preferred embodiment the air channel comprises an array of annular grooves in the shell, having their centers in the axis of the burner and each lying in a plane perpendicular to that axis and similar ridges in an alternating relationship, two consecutive grooves thus being separated by a ridge and being connected by a hole in the separating ridge, the holes in two consecutive ridges being positioned diametrically opposed. In this arrangement a long path is secured for the supplied air which provides a higher heat transfer from combustion gases to this air at a given length of the burner or allows a shorter length of the burner to achieve a required heat transfer, both in comparison with a heat exchanger having another construction, in particular with one having a spiraling air channel.

Figure 4:
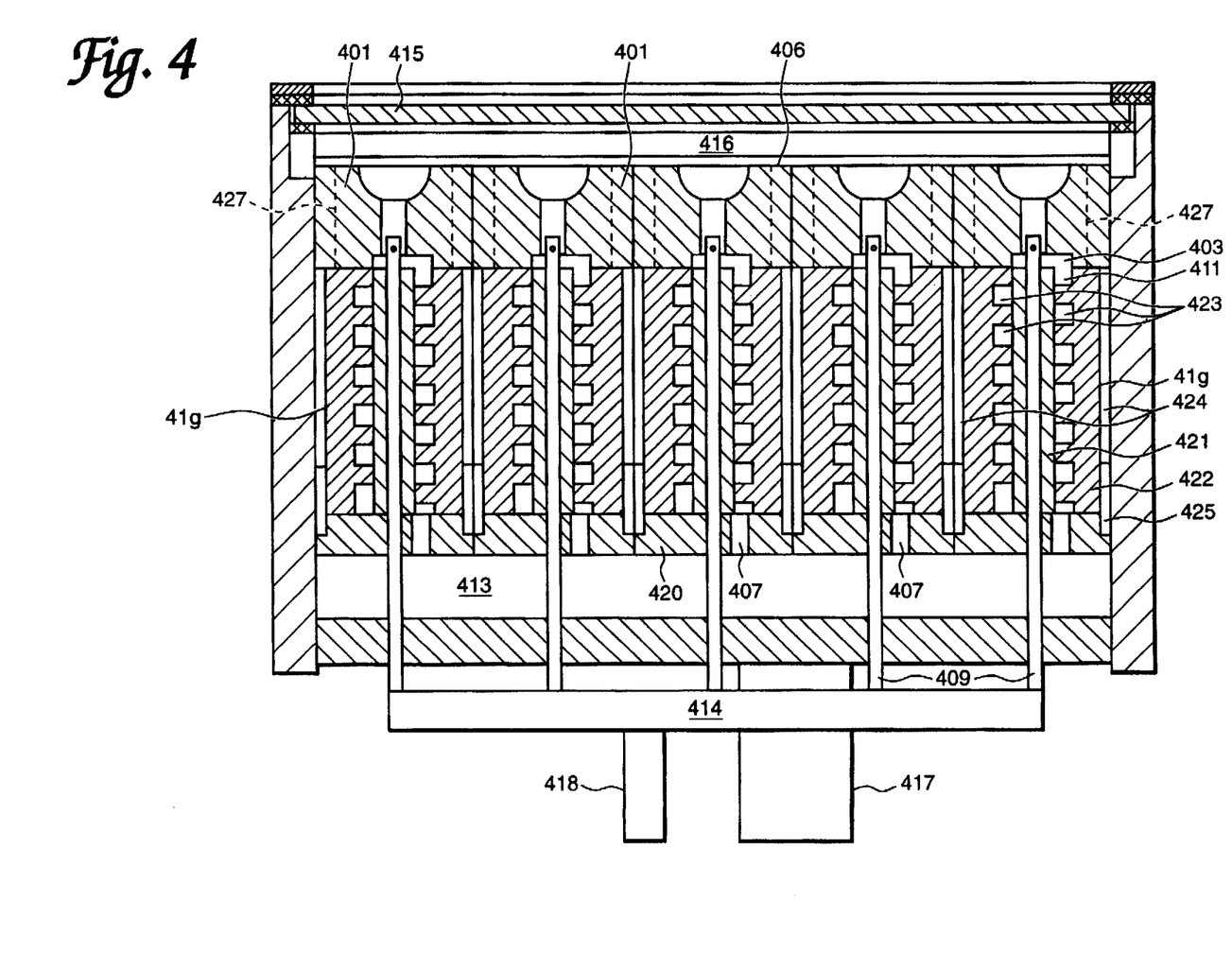
FIG. 4 is a cross-sectional view of a composite closed burner system of the invention, in which each individual burner is provided with its own heat exchanger.

In FIG. 4 each burner space is a space left in a single block 401. A heat exchanger 419 is fitted adjacent each block 401 for each burner. Partition 420 separates air plenum 413 from the heat exchangers 419. Air from air plenum 413 is supplied to each of the heat exchangers 419 through channels 407 extending through the partition 420. Fuel is supplied from gas plenum 414 to each of the burners through gas supply lines 409. The application of gas and air plenums is optional and the gas and air supply can easily be provided by separate lines for each burner.

In each burner, the heat exchanger consists of two concentric cylindrical shells 421 and 422, which are fitted around the gas supply channel 409. A spiralled groove 423 is left in the outer shell 422, which groove begins at the air supply line 407 in partition 420 and ends in the tangential inlet 411 of swirl chamber 403. The combustion air is supplied to the swirl chamber 403 through this groove 423. A cylindrical chamber 424 is disposed around the outside of the outer shell 422. On the side nearest to the burner, this chamber 424 communicates with the receptacle for the combustion gases 416 through a channel extending from the top face 406 of the burner through the block 401 to the heat exchanger 419. The location of this channel is schematically indicated by dotted lines 427. On the site opposite the burner, the chamber 424 communicates through channel 425 with a common discharge for the combustion gases. The combustion gases travel through the cylindrical chamber 424 to the aforementioned discharge, in which process they transfer their heat to shell 422. The walls of the chamber 424 preferably are finned or grooved to enlarge the surface area, which results in improved heat transfer. This shell consists of a material that conducts heat well. The heat exchanged to the shell is taken up from the shell by the air which is supplied through groove 423 and which on being so heated enters the swirl chamber 403. In this way, the air temperature at the inlet of the swirl chamber may be as high as about 600° C., so that a very high combustion efficiency is attained. Cylindrical shell 421 consists of a heat-insulating material and screens the fuel supply line 409 from the heat exchanging part proper, consisting of the elements 422, 423 and 424 in order to prevent the gas supplied from reaching too high and dangerous temperature levels. Plate 415 is provided above top face 406.

In FIG. 4, it is noted that the shading in the right-most burner is different from that in the other burners so as to enhance the clarity of the reference numbers. This does not imply that this burner has a different design than the other burners.

The burner of the invention may be used as an individual burner or as a building block in a composite burner in heating appliances for domestic or industrial use. The closed burner of the invention is particularly suitable for drying applications in the printing industry and in the paper and textile industry, for product treatment in the foodstuff industry, for space heating and in kitchens as a grill or as an alternative to electric, ceramic hot plates. A particularly advantageous application of the closed burner of the invention is that of the wall in an oven. This makes for much simpler oven designs than conventional ovens, in which, for example, electrical heating elements are incorporated in refractory walls. An oven employing at least one burner of the invention as a wall also requiring much less maintenance than the conventional one since only the outside surface of the radiation plate is exposed to the staining effect of the environment. It is much easier to clean than a plurality of individual burners of heating elements.

Yet another application of the composite burner of the invention is for heating an object, for example an oven wall, by positioning the burner at a short distance, for example 5 mm or less from that object. In this position this object is heated in the same way as a sealing radiation plate in the closed composite burner according to the invention. In contrast to the structure in which the burner forms part of an oven wall as described hereinbefore, in this latter situation the position of the burner on the oven wall can be chosen deliberately and changed easily if desired. Preferably a sealing strip is positioned along the circumference of the burner top face in order to seal the opening between the burner top face and the object to be heated. In this way the combustion gases are forced through the burner body, thus providing for an optimal heat exchange between these gases and the supplied air.

The priority Application No. 09500120, filed in Belgium on Feb. 15, 1995, is hereby incorporated into the present specification by this reference.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. A burner for a gaseous fuel, comprising:

a swirl chamber, in the form of a right cylinder, defined by a side wall, a bottom face and a top face, said top face defining a top opening of said swirl chamber, walls defining a burner bowl disposed on an axis of the swirl chamber, the burner bowl opening to a top surface of the burner, walls defining a mixing channel connecting the top opening of the swirl chamber to the burner bowl, at least one supply line for supplying an oxidizing gas to the swirl chamber through the side wall thereof, the supply line being disposed generally tangentially to the side wall of the swirl chamber, and a fuel supply line disposed coaxially with the swirl chamber, wherein the fuel supply line extends through the swirl chamber into the mixing channel and includes, near the opening in the top face of the swirl chamber, outflow openings for introducing fuel into the mixing channel, and wherein the cross-section of the swirl chamber transverse to the axis thereof has a larger area than the cross-section at the opening in the top face of the swirl chamber.

2. The burner according to claim 1, wherein the burner bowl has a concave shape and a ratio of a length of the side wall of the swirl chamber and a length of the mixing channel is between 1:8 and 1:2.

3. The burner according to claim 1 wherein the walls of the swirl chamber, the mixing channel and the burner bowl consist of a ceramic material.

4. The burner according to claim 1, further comprising a heat-resistant plate provided over the top surface, which plate screens the burner off from a surrounding area.

5. The burner according to claim 4, wherein a distance between the plate and the top surface of the burner is at most 5 mm.

6. The burner according to claim 5, wherein a distance between the plate and the top surface of the burner is at most 2 mm.

7. The burner according to claim 4, wherein the plate connects to the top surface of the burner without any space therebetween.

8. The burner according to claim 4, further comprising an integrated heat exchanger associated with the burner.

9. The burner according to claim 8, wherein the heat exchanger comprises a shell fitted concentrically with the gas supply line, provided with an air channel which connects to the gas supply line of the swirl chamber, and a channel for these combustion gases, which communicates with a space between the top surface of the burner and the plate.

10. The burner according to claim 9, wherein the space between the top surface of the burner and the sealing plate communicates with the channel for the combustion gases through a channel running through the burner outside the burner bowl.

11. The burner according to claim 1, wherein the top surface of the burner is provided with grooves.

12. A closed composite burner system including a plurality of adjoining burners, each said burner comprising:

a swirl chamber, in the form of a right cylinder, defined by a side wall, a bottom face and a top face, said top face defining an opening in said swirl chamber, walls defining a burner bowl disposed on an axis of the swirl chamber, the burner bowl opening to a top surface of the burner, the burner bowl being connected to said swirl chamber, walls defining a mixing channel connecting the swirl chamber with the burner bowl, at least one supply line for supplying an oxidizing gas to the swirl chamber, the supply line opening tangentially into the side wall of the swirl chamber, and a fuel supply line disposed coaxially with the swirl chamber, wherein the fuel supply line extends through the swirl chamber into the mixing channel and includes, near the opening in the top face of the swirl chamber, outflow openings for introducing fuel into the mixing channel, and wherein the cross-section of the swirl chamber transverse to the axis thereof has a larger area than the cross-section at the opening in the top face of the swirl chamber.

13. The composite burner system according to claim 12, wherein said top surface of each burner defines a top face of said composite burner, said top surfaces lying in one plane and being incorporated in a casing which is isolated from the surrounding area by means of a heat-resistant plate disposed above the top face of the composite burner and in which each burner is provided with separate supply lines for fuel and oxidizing gas.

14. The composite burner system according to claim 13, wherein a distance between the plate and the plane in which the top sides of the burners lie is at most 5 mm.

15. The composite burner system according to claim 14, wherein a distance between the plate and the plane in which the top sides of the burners lie is at most 2 mm.

16. The composite burner system according to claim 13, further comprising an integrated heat exchanger associated with each said burner.

17. The composite burner system according to claim 16, wherein each heat exchanger comprises a shell fitted concentrically with the gas supply line, provided with a channel for oxidizing gas, which connects to the air supply of the swirl chamber and a channel for the combustion gases, which communicates with a space between the top face of the composite burner and the plate.

18. The composite burner system according to claim 17, in which the space between the top face of the composite burner and the plate communicates with the channel for the combustion gases through channels running through the burners outside the burner bowls.

19. The composite burner system according to claim 13 in combination with an oven, said burner system defining at least a portion of a wall of the oven.

20. The composite burner system according to claim 12, wherein the top surfaces of the burners are provided with grooves.

21. The composite burner system according to claim 20, wherein the plate is disposed on the top face of the composite burner without any space therebetween.

22. A process for heating an object using a burning system, the burning system including a plurality of burners, each burner including: a swirl chamber, in the form of a right cylinder, defined by a side wall, a bottom face and a top face, said face defining an opening in said swirl chamber; walls defining a burner bowl disposed on an axis of the swirl chamber, the burner bowl opening to a top surface of the burner, the burner bowl being connected to said swirl chamber; walls defining a mixing channel connecting the swirl chamber with the burner bowl; at least one supply line for supplying an oxidizing gas to the swirl chamber, the supply line opening tangentially into the side wall of the swirl chamber, and a fuel supply line disposed coaxially with the swirl chamber, said fuel supply line extending through the swirl chamber into the mixing channel and including, near the opening in the top face of the swirl chamber, outflow openings for introducing fuel into the mixing channel, and the cross-section of the swirl chamber transverse to the axis thereof having a larger area than the cross-section at the opening in the top face of the swirl chamber, the process including:

ensuring that an object is disposed adjacent the burner system with a gap therebetween, said gap being 10 mm or less, and heating the object with the burner system.

* * * * *